(No Model.)
P. M. SHARPLES.
CENTRIFUGAL SEPARATOR.
No. 570,737. Patented Nov. 3, 1896.
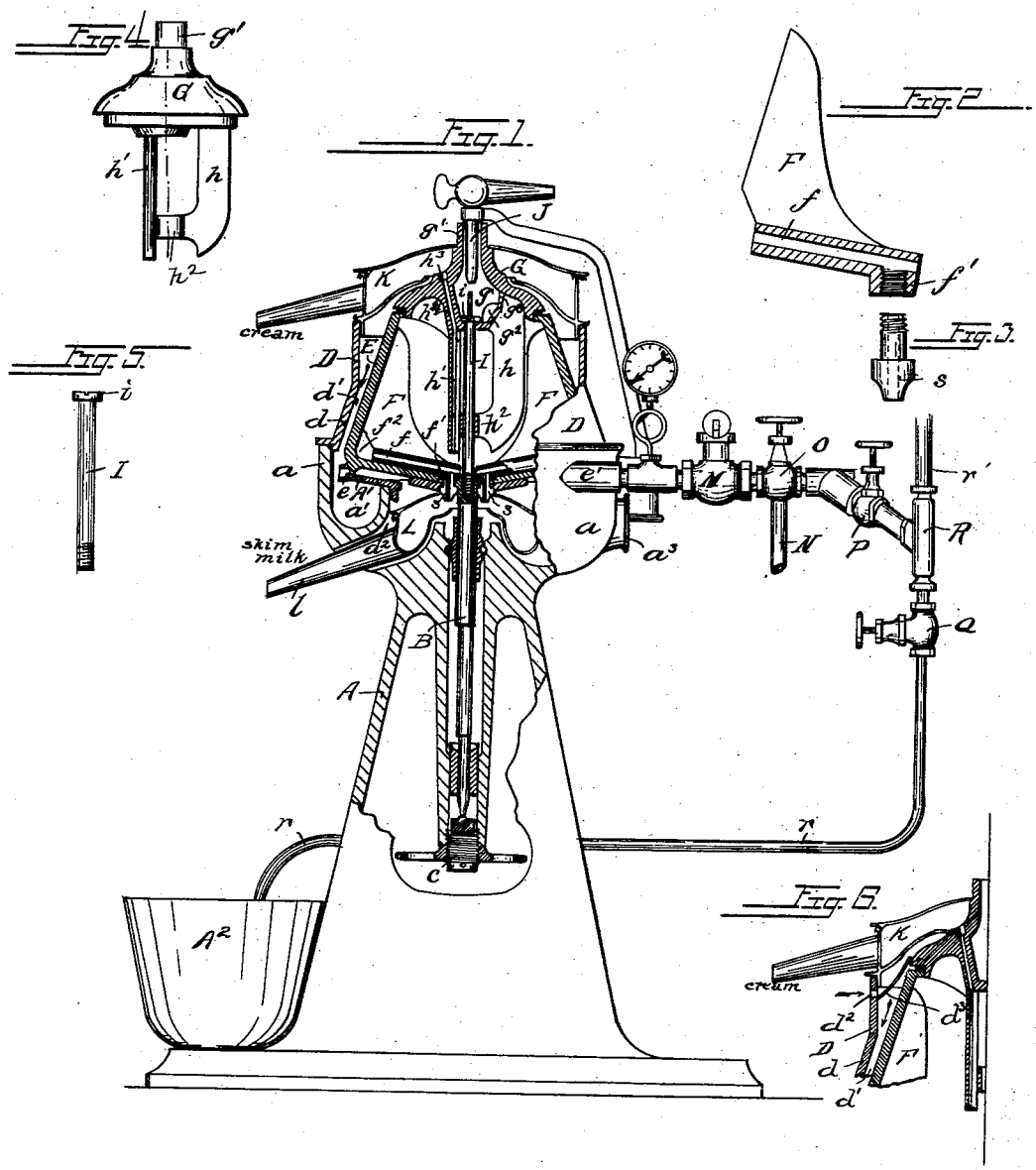

UNITED STATES PATENT OFFICE.

PHILIP M. SHARPLES, OF WEST CHESTER, PENNSYLVANIA.

CENTRIFUGAL SEPARATOR.

SPECIFICATION forming part of Letters Patent No. 570,737, dated November 3, 1896.

Application filed April 14, 1892. Serial No. 429,146. (No model.)

*To all whom it may concern:*

Be it known that I, PHILIP M. SHARPLES, a citizen of the United States, residing at West Chester, in the county of Chester, State of Pennsylvania, have invented certain Improvements in Centrifugal Separators, of which the following is a specification.

This invention relates particularly to the separating of cream from milk by centrifugal force; and the main objects of the invention are, first, to improve the process by effecting the simultaneous aeration and cooling of the cream as it is continuously separated from the skim-milk; second, to produce a continuous downward current of air around the separator vessel; third, to utilize substantially the whole space within the centrifugal vessel as a separating-chamber; fourth, to provide a simple apparatus which may be conveniently and economically operated and handled and having a maximum separating capacity. The manner in which I effect these objects is fully described in connection with the accompanying drawings, and the novel features are specifically pointed out in the claims.

Figure 1 is an elevation, mainly in section, of an apparatus embodying all the features of my invention. Fig. 2 is a detail view of the main wing, Fig. 3 of the skim-milk-discharge nozzle, Fig. 4 of the top or cover of the centrifugal vessel, and Fig. 5 of the central connecting-bolt. Fig. 6 shows a slightly-modified form.

The general features of the present machine are somewhat similar to those shown in Patent No. 442,461, issued to myself and D. T. Sharples December 9, 1890, the centrifugal vessel being similarly mounted and operated by means of a jet of steam applied directly to the periphery of the vessel. The spindle B, upon which the separator vessel E is mounted, in the present case is supported on an adjustable step-bearing $c$ within the stand or frame A, the upper portion $a$ of the latter serving, in connection with a removable portion D, as a casing within which the separator vessel rotates. The latter is in the form of a frustum of a cone, the opening to which, though at the small end, is quite large, so as to permit ready access. The wings F, which are formed with tubular conduits $f$, are removably secured within the vessel by means of the hollow screws $s$, which pass upward through the bottom of the vessel and engage the screw-threaded boss $f'$ at the inner end of each conduit $f$. This boss is recessed into the inner face of the bottom of the vessel, while the conduit runs substantially parallel with the bottom and communicates with the portion of the vessel $f^2$ farthest from the center. The hollow screws $s$ thus serve both to secure the wings and as discharge-nozzles for the skim-milk.

The vessel E is provided with a top or cover G, which forms a joint upon the upper edge of the vessel and is held in place by means of a central bolt I. The head $i$ of this bolt is of a size adapted to enter the small opening in the neck $g'$ of the top, and the body of the bolt passes downward through the bottom of the feed-cup $g$, which is formed integral with the top G, and is screwed into the bottom of the vessel, while the head bears upon the bottom of the feed-cup. This feed-cup, which is thus located at the top of the vessel, communicates through the opening $g^8$ with the vessel and is provided with small vanes $g^2$, which serve to cause the milk admitted through the inlet-nozzle J to rotate with the vessel and be thrown outward through the opening $g^3$. Depending from the top or cover G, adjacent to this opening, is a wing $h$, adapted to supplement the main wing F, and on the opposite side of the center from this supplemental wing and connected with it at the lower end by means of a boss $h^2$, through which the bolt I passes, is a vertical cream-channel $h'$, which also depends from the feed-cup $g$ and extends nearly to the bottom of the vessel. This channel takes the cream from near the center of the vessel and conveying it through the passage $h^4$ in the top G discharges it into the cream-receptacle K.

The skim-milk discharged at the bottom of the vessel through the nozzle $s$ is received by a receptacle L. The latter occupies a chamber $a^2$, formed in the casing portion $a$ of the supporting-frame, and is provided with a discharge-spout $l$, which projects through the casing. It is readily placed in position or removed when the vessel E is not in place.

The separator vessel is rotated by means of a steam-jet which enters the casing at $e'$ and impinges directly against the wings or buckets $e$. These are located at the periphery of the base of the vessel, below the annular passage $d'$, between the conical walls of the vessel and the conical portion $d$ of the casing D, and above the exhaust-chamber $a'$ of the main casing, which latter is provided with an exhaust-outlet $a^3$. The partition-plate A' separates the chamber $a'$ from the receptacle-chamber $a^2$ and from the bottom of the vessel, and the conical portion $d$ of the casing separates it from the space above the same which surrounds the upper portion of the vessel and over which the cream-receptacle K is located.

It is frequently desirable that the skim-milk be raised to a higher level than that of the machine, and as it is also an advantage to heat the skim-milk, which is thereby kept sweet a considerably longer time than otherwise, I have arranged, in combination with the steam-jet mechanism for rotating the separator vessel, an ejector or jet-pump R. This communicates by means of a pipe $r$ with a storage-receptacle $A^2$, into which the skim-milk is delivered from the spout $l$, and a pipe $r'$ extends from it to the higher level. The ejector is connected to the same steam-pipe N which supplies the jet for operating the vessel E. Upon opening the valve O the steam passes through an automatic pressure-regulating valve M to the nozzle $e'$, where it impinges against and causes the rotation of the vessel E, and by opening also the valve P it is supplied at the same time to the ejector R. Whether one only or both of these valves are opened the same speed of rotation is automatically maintained. The degree of heat imparted to the skim-milk may be accurately regulated by opening more or less a valve Q, provided in the skim-milk pipe.

I provide in the cream-outlet $h^2$ any suitable device for adjusting the discharge in substantially the ordinary way.

The separation of the cream is effected by centrifugal force during the operation of the machine, and the skim-milk is continuously discharged at $s$ and the cream at $h^3$. These points of discharge being as near as practicable to the center of rotation not only enable substantially the whole space within the bowl to be utilized as a separator-chamber, but cause the cream to be discharged at a lower velocity and in better condition. As it leaves the rapidly-rotating bowl, however, it is spread out in a thin film in the receptacle K, so as to be readily aerated if subjected to a current of air, and such a current is automatically produced by the operation of the machine. The rotation of the conical vessel E by its centrifugal action upon the surrounding air-film produces a current of air downward through the space between the receptacle K and the rotating vessel and through the annular passage $d'$ between the conical walls of the vessel and of the fixed casing and out through the opening $a^3$, the velocity of the current depending upon the relative distance of the inlet and outlet points from the center and the narrowness of the passage, which latter is readily regulated by raising or lowering the adjustable step-bearing $c$ or the casing D. The construction and fitting of the receptacle K is readily arranged to admit a sufficient amount of air without necessarily providing special inlets, while the exhaust opening $a^3$ at the periphery of the casing $a$ serves as an ample exit below the vessel. The air in passing through the receptacle K is brought into intimate contact with the film of discharging cream, thus thoroughly aerating it (which, as is well known, improves its quality) and at the same time changing its temperature, especially if refrigerated air is applied, as may readily be done, if desired. This downward current of cool air, however, effects more than the aeration and cooling of the discharging cream. Being brought in contact with the outer wall of the vessel E it lowers the temperature of that portion of the milk which comes in contact with it, thus rendering the separation of the cream more easy and thorough. This changing of the temperature of that portion of the contents of the vessel which is farthest from the center during the continuous operation of the machine differs from that described and claimed in my previous patent before referred to (No. 442,461) only in lowering instead of raising the temperature, as was specifically provided for in said patent.

When the vessel is rotated by means of a steam-jet, as in the present case, the downward current of air produces an additional useful effect in causing the rapid removal of the exhaust-steam through the outlet $a^3$ of the casing.

It will be noticed that by my improved construction not only is substantially the whole vessel used as a separator, the discharge-outlets being very near the center, but at the same time every part is easily gotten at for cleaning and repairs by merely removing the top G with its attached parts. The compact arrangement of the ejector for lifting and heating the skim-milk, in combination with the steam-nozzle for operating the vessel, is highly advantageous and convenient.

In the construction indicated in Fig. 6 special air-inlets $d^2$ are provided below the cream-receptacle, and a partition-plate $d^3$ causes the current of air to circulate in contact with the bottom of the receptacle before passing downward through the conical passage $d'$. With this arrangement the air admitted at $d^2$ tends to cool the cream, though not brought into contact with it so as to aerate it.

Having thus fully described my invention, I do not limit myself to the exact terms in which it is set forth, but

What I claim is—

1. The combination with the conical centrifugal vessel having the cream-outlet at the smaller end thereof and a fixed receptacle loosely surrounding said cream-outlet, of the fixed casing having a corresponding conical portion inclosing the vessel and forming a conical air-passage around the latter, said casing having an opening below the conical portion, and means for varying the area of the air-passage to regulate the flow of air around the vessel, substantially as and for the purpose set forth.

2. The combination of the separator vessel of the removably-secured top or cover G provided with feed-cup $g$, wing $h$ and cream-channel $h'$, substantially as set forth.

3. The combination with the separator vessel of the removable top or cover G provided with feed-cup $g$ having a small neck with central inlet, and cream-channel $h'$ and wing $h$ extending below the cup on opposite sides of the center, and the central bolt I having its head seated in the cup and its opposite end secured to the bottom of the vessel, substantially as set forth.

4. The combination with the separator vessel of the movably-secured top or cover G formed with feed-cup $g$ having a small neck with central inlet, vanes $g^2$ within said cup and outlet $g^3$ therefrom into the vessel, and the cream-channel extending through the top or cover, all substantially as set forth.

5. The combination with the separator vessel having a bottom discharge and the steam-nozzle for operating the same, of the cylindrical casing $a$ formed with a central chamber $a^2$ for a liquid-receptacle, and an annular exhaust-chamber $a$ surrounding said central chamber and provided with an outlet for the steam and a partition-plate A' all substantially as and for the purpose set forth.

In testimony whereof I affix my signature in presence of two witnesses.

PHILIP M. SHARPLES.

Witnesses:
ED. A. KELLY,
W. G. STEWART.